(12) United States Patent
Kaltenmaier

(10) Patent No.: US 9,988,023 B2
(45) Date of Patent: Jun. 5, 2018

(54) ACTIVATION DEVICE FOR A PARKING BRAKE

(71) Applicant: Power-Cast Light Metal Solutions GmbH & Co. KG, Schlierbach (DE)

(72) Inventor: Wolfgang Kaltenmaier, Gruibingen (DE)

(73) Assignee: Power-Cast Light Metal Solutions GmbH & Co. KG, Schlierbach (DE)

( * ) Notice: Subject to any disclaimer, the term of this patent is extended or adjusted under 35 U.S.C. 154(b) by 24 days.

(21) Appl. No.: 15/115,300

(22) PCT Filed: Jan. 30, 2015

(86) PCT No.: PCT/EP2015/051880
§ 371 (c)(1),
(2) Date: Jul. 29, 2016

(87) PCT Pub. No.: WO2015/124402
PCT Pub. Date: Aug. 27, 2015

(65) Prior Publication Data
US 2017/0001607 A1    Jan. 5, 2017

(30) Foreign Application Priority Data

Feb. 21, 2014    (DE) .................... 20 2014 100 781 U

(51) Int. Cl.
*B60T 7/10*      (2006.01)
*G05G 1/04*      (2006.01)
(Continued)

(52) U.S. Cl.
CPC .............. *B60T 7/105* (2013.01); *B60T 7/102* (2013.01); *B60T 7/104* (2013.01); *B60T 7/108* (2013.01);
(Continued)

(58) Field of Classification Search
CPC .......... B60T 7/105; B60T 7/104; B60T 7/102; B60T 7/108; B60T 7/101; B60T 7/08;
(Continued)

(56) References Cited

U.S. PATENT DOCUMENTS 1,631,066 A     5/1927 Saget
5,875,689 A *   3/1999 Huebner ................. B60T 7/104
                                                    74/529
2010/0294076 A1* 11/2010 Barcin .................... B60T 7/102
                                                    74/523

FOREIGN PATENT DOCUMENTS

DE    102005057037 A1    6/2007
DE    102006044197 A1    3/2008
(Continued)

OTHER PUBLICATIONS

EPO Translation of the Description of FR 2964353 A1, Briard J. L., Mar. 9, 2012.*

*Primary Examiner* — Daniel D Yabut
(74) *Attorney, Agent, or Firm* — Michael Soderman

(57) ABSTRACT

The invention relates to an activation device (1) for a parking brake with a parking brake lever (2) swivel-mounted on a bearing block (3) and with a blocking device comprised of a pawl (13) on the parking brake lever (2) and a locking segment (12) on the bearing block (3). The parking brake lever (2) is fixed in place in a swivel position via the engagement of the pawl (13) with the locking segment (12). The swivel position of the parking brake lever (2) is transmitted via a transmission element to the parking brake and with a transfer device in or on the parking brake lever (2). The engagement of the pawl (13) with the locking segment (12) is released by actuating the transfer device. To form a swivel bearing, a shaft is provided to which a holder (7) for the transmission element and the parking brake lever (2) can be affixed in different rotational positions. As an alternative, (Continued)

or in addition, a linear movement of the pawl (13) is brought about by means of the transfer device.

12 Claims, 2 Drawing Sheets

(51) Int. Cl.
*G05G 1/10* (2006.01)
*G05G 1/12* (2006.01)
*G05G 5/12* (2006.01)
*G05G 5/08* (2006.01)

(52) U.S. Cl.
CPC ................ *G05G 1/04* (2013.01); *G05G 1/10* (2013.01); *G05G 1/12* (2013.01); *G05G 5/08* (2013.01); *G05G 5/12* (2013.01)

(58) Field of Classification Search
CPC .. G05G 1/14; G05G 1/12; G05G 1/06; G05G 5/24; G05G 5/18; G05G 5/12; Y10T 74/20666–74/20696; Y10T 74/20714; Y10T 74/2072
See application file for complete search history.

(56) References Cited

FOREIGN PATENT DOCUMENTS

| DE | 102013205803 A1 | 10/2013 | |
|----|----|----|----|
| EP | 2468591 A2 | 6/2012 | |
| FR | 2964353 A1 * | 3/2012 | .............. B60T 7/105 |

* cited by examiner

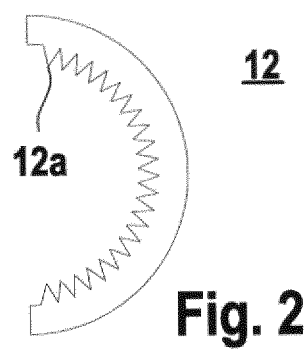

— 1 —
ACTIVATION DEVICE FOR A PARKING BRAKE

CROSS REFERENCE TO RELATED APPLICATIONS

This application is the U.S. national stage of International Application No. PCT/EP2015/051880, filed on, Jan. 30, 2015. The international application claims the priority of DE 202014100781.4 filed on Feb. 21, 2014; all applications are incorporated by reference herein in their entirety.

BACKGROUND

The invention relates to an activation device in accordance with the preamble of claim 1.

An activation device of that type is known from DE 10 2009 022 460 A1, for instance. This activation device is comprised of a parking brake lever swivel-mounted on a bearing block; the parking brake lever can be fixed in place in a specified swivel position via a blocking device. The blocking device is comprised of a locking segment that is fastened to the bearing block with separate fastening agents and a pawl that is fastened with a pivot bearing so as to be able to swivel on the parking brake lever. Furthermore, the activation device is comprised of an actuation rod that is held in the parking brake lever and that is in an operative connection with the blocking device. A tube-shaped receptacle that is swivel-mounted to the bearing block is provided to form a swivel bearing that is firmly connected to the parking brake lever and that supports a transmission element by means of which the swivel position of the parking brake lever can be transmitted to the parking brake. The parking brake lever can be pressed in different rotational positions on a piece of the tube-shaped receptacle. Two bearing bushings are inserted into the hollow area of the tube-shaped receptacle and fixed in position at the respective ends of the hollow area. A bearing tube is then inserted into the hollow area; it is also inserted into holes of the bearing block and peened there.

Drawbacks with regard to this activation device are its complex design structure and the undesirably high number of individual parts. In particular, the assembly of the swivel bearing is undesirably complex because of the high number of individual parts and the required peening of the bearing tube as an additional assembly step. The design of the pivot bearing of the pawl on the parking brake lever also requires several individual parts and requires a high level of assembly expense.

SUMMARY

The invention relates to an activation device (1) for a parking brake with a parking brake lever (2) swivel-mounted on a bearing block (3) and with a blocking device comprised of a pawl (13) on the parking brake lever (2) and a locking segment (12) on the bearing block (3). The parking brake lever (2) is fixed in place in a swivel position via the engagement of the pawl (13) with the locking segment (12). The swivel position of the parking brake lever (2) is transmitted via a transmission element to the parking brake and with a transfer device in or on the parking brake lever (2). The engagement of the pawl (13) with the locking segment (12) is released by actuating the transfer device. To form a swivel bearing, a shaft is provided to which a holder (7) for the transmission element and the parking brake lever (2) can be affixed in different rotational positions. As an alternative, or in addition, a linear movement of the pawl (13) is brought about by means of the transfer device.

DETAILED DESCRIPTION

The invention is based on the objective of providing an activation device of the type mentioned at the outset that has a high level of functionality with low construction expenses.

The elements of claim 1 are specified to solve this problem. Advantageous embodiments and useful design developments of the invention are described in the sub-claims.

The invention relates to an activation device for a parking brake with a parking brake lever swivel-mounted on a bearing block and with a blocking device comprised of a pawl on the parking brake lever and a locking segment on the bearing block. The parking brake lever is fixed in place in a swivel position via the engagement of the pawl with the locking segment. The swivel position of the parking brake lever is transmitted via a transmission element to the parking brake and with a transfer device in or on the parking brake lever. The engagement of the pawl with the locking segment is released by actuating the transfer device. To form a swivel bearing, a shaft is provided to which a holder for the transmission element and the parking brake lever can be affixed in different rotational positions. As an alternative, or in addition, a linear movement of the pawl is brought about by means of the transfer device.

A major advantage of the activation device as per the invention is that it has a modular structure, which makes assembly with short assembly times possible, on the one hand, and which also makes an adaptation to different usage conditions possible.

It is especially advantageous with regard to the activation device as per the invention that the holder for the transmission element and the parking brake lever on the shaft forming a swivel bearing can be mounted as modular units in different rotational positions. The holder with the transmission element can therefore be mounted in angular positions that can be freely chosen with respect to the parking brake lever; an adaptation to different usage conditions is made possible in a simple way because of that.

It is particularly advantageous when the shaft has a shaft segment with external teeth. The holder and the parking brake lever each have a tube-shaped receptacle with internal teeth; the tube-shaped receptacles with the internal teeth can be engaged in different rotational positions with the external teeth of the shaft segment.

The holder for the transmission element and the parking brake lever can consequently be assembled on the shaft segment with a simple mounting and engagement.

As a further advantage, the shaft has a termination element that can be engaged on the shaft segment; the shaft is rotatably mounted in the axle receptacles of the bearing block.

The shaft itself can therefore also be simply and quickly mounted as a swivel bearing on the bearing block.

A further important advantage of the invention is that a linear movement of the pawl is brought about by means of the actuation element. A pivot bearing of the pawl on the parking brake lever that has a complex design is therefore no longer necessary, because the pawl no longer has to carry out a swivel movement to be moved towards or away from the locking segment.

The transfer device can be designed in principle in the form of a cable or the like that is routed in the parking brake lever and that brings about a coupling of the pawl to an actuation element like a button on the front end of the parking brake lever to the effect that the movement of the button is transferred to the pawl.

As a special advantage, the actuation element is formed by an actuation rod that is supported in a movable way in the longitudinal direction in the parking brake lever.

The actuation rod is coupled via a catch to the pawl here, so the movement of the actuation rod is converted into a linear movement of the pawl.

The linear movement of the actuation rod is passed along directly and without further redirection means to the pawl in this embodiment. It is advantageous here that the pawl is mounted in guides of the parking brake lever so as to be movable in its longitudinal direction. The pawl then advantageously forms a slide-in part that can be loosely inserted into the guides.

Forced guidance of the pawl is therefore obtained that ensures that the movement of the actuation rod will be precisely converted into a linear movement of the pawl in the direction of the locking segment.

Since the pawl is not moved towards the locking segment with a swiveling movement, but instead with a linear movement, the pawl can have multiple ratchet teeth that can be engaged with the teeth of the locking segment in order to thereby fix a swivel position of the parking brake lever in place on the bearing block. Compared to known blocking devices in which the pawl is moved towards the locking segment with a rotational movement, and the pawl can therefore only have one ratchet tooth, a substantially better hold of the pawl on the locking segment can consequently be obtained, and substantially improved functionality of the blocking device exists because of that.

The locking segment is advantageously connected in a fixed way with the bearing block so that the locking segment and the bearing block constitute one physical unit.

It is especially advantageous when the bearing block and the locking segment are designed as one part.

In particular, the bearing block and the locking segment are made of one die-cast part.

The one-piece design of the locking segment and the bearing block does not just involve production-related advantages because both elements can now be manufactured in one manufacturing operation. A further important advantage is that the locking segment can be manufactured with the design as a die-cast part in a substantially more precise way than with stamped parts, as was previously done. Since, in particular, the molds of the teeth of the locking segment are precise in terms of manufacturing and can be specified with freely chosen geometries, the hold of the pawl on the locking segment is improved even further.

BRIEF DESCRIPTION OF THE DRAWINGS

The invention will be explained with the aid of the drawings below. The following are shown in the figures:

FIG. 2: Sectional view of a locking segment of the activation device in accordance with FIG. 1.

DETAILED DESCRIPTION OF THE PREFERRED EMBODIMENTS

Figure 1:
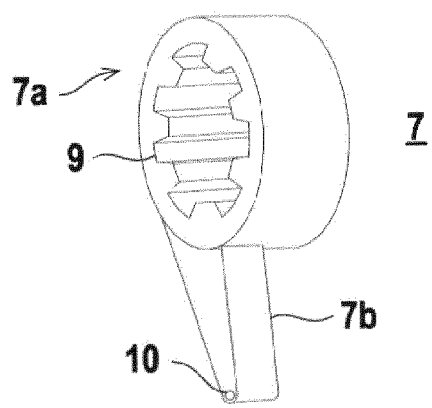
FIG. 1: Schematic diagram of components of an example of the activation device for a parking brake as per the invention.
Figure 1:
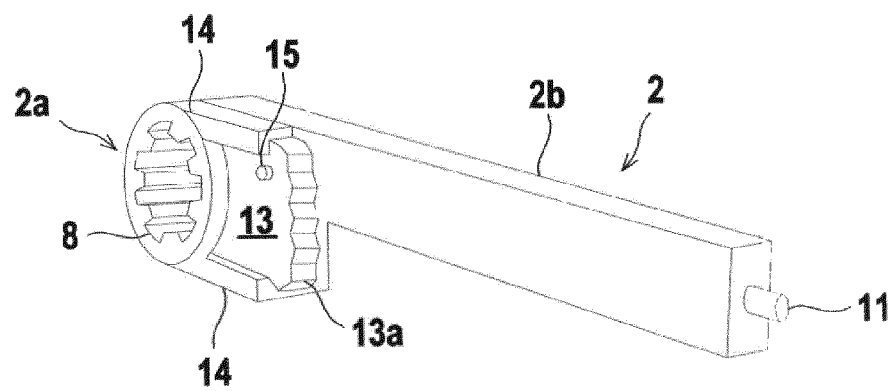
Figure 1:
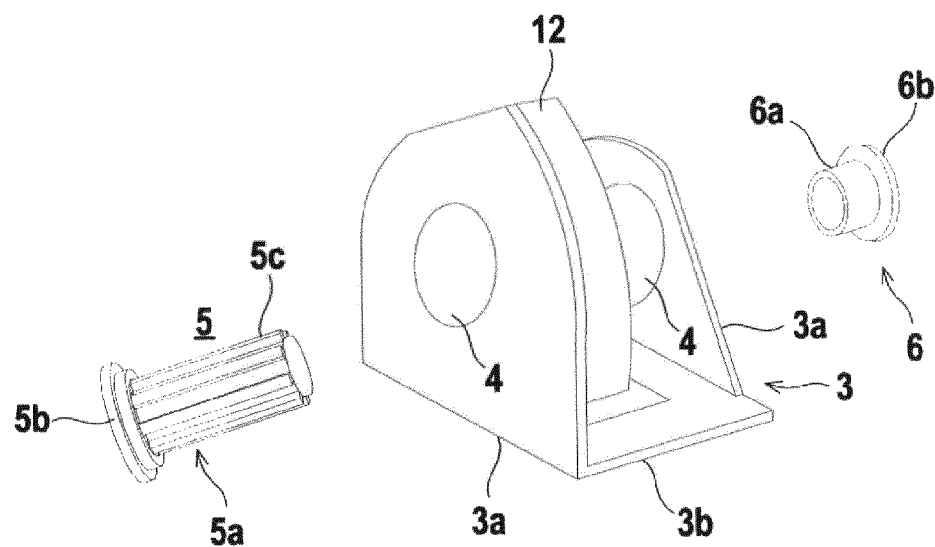

FIG. 1 shows the essential components of an example of the activation device 1 as per the invention for a parking brake of a motor vehicle.

The activation device 1 has a parking brake lever 2 and a bearing block 3; the parking brake lever 2 can be swivel-mounted on the bearing block 3 via a swivel bearing. The bearing block 3 and the parking brake lever 2 are advantageously made of one die-cast part. Each die-cast part is comprised of a metallic material, in particular magnesium or aluminum.

The bearing block 3 is comprised of two flanks 3a with identical designs and a base piece 3b. The identically designed flanks 3a run in parallel and at a distance to one another. The flanks 3a project at a right angle from the base piece 3b in each case and are designed to be one piece with it. To form the swivel bearing, each flank has an axle receptacle 4; these axle receptacles 4 serve to hold a shaft. These axle receptacles 4 can already be provided as an empty space in the manufacturing process of the die-cast part of the bearing block 3. In principle, the axle receptacles 4 can also be subsequently worked in as holes in the bearing block 3.

The shaft in this case is made of two parts, namely a shaft segment 5 and a termination element 6. The termination element 6 has a hollow cylindrical shaft piece 6a and a head piece 6b that is broadened with respect to the shaft piece 6a. The shaft piece 6a of the termination element 6 can be inserted into an opening on a longitudinal end of the shaft segment 5 and engaged there.

The shaft segment 5 likewise has a hollow cylindrical shaft piece 5a; a ring-shaped piece 5b that is broadened with respect to the shaft piece 5a is connected to one of its longitudinal ends. External teeth 5c are formed on the external surface. The external teeth 5c are comprised of a regular arrangement of projections that are separated by intermediate spaces with a uniform design. The projections and the intermediate spaces run in parallel with one another in each case and extend over the entire length of the shaft piece 5a of the shaft segment 5.

Both the parking brake lever 2 and a holder 7 for a transmission element can be engaged in the external teeth 5c of the shaft segment 5 to assemble the activation device 1. Both the parking brake lever 2 and the holder 7 for the transmission element have a tube-shaped receptacle 2a, 7a with internal teeth 8, 9 for this. The tube-shaped receptacles 2a, 7a have a hollow cylindrical design in each case. The internal teeth 8, 9 are formed on the circular cylindrical internal wall of each tube-shaped receptacle 2a, 7a surrounding the hollow area here. Each set of internal teeth 8, 9 is comprised of a regular arrangement of grooves with an identical design that have a design complementary to the projections of the external teeth 5c of the shaft segment 5.

Furthermore, the holder 7 has a wedge-shaped piece 7b that ends at the side of the external surface of the tube-shaped receptacle 7a and that is designed to be one piece with it. A hole 10 is provided at the front end of the piece 7b. This hole 10 serves to fasten a transmission element, not shown, that can be a cable or a rod. This transmission element constitutes a coupling part that couples the activation device 1 to the parking brake.

To assemble the activation device 1, the shaft segment 5 is guided through the hole 4 of a flank 3a of the bearing block 3 to start with. The internal teeth 8, 9 of the tube-shaped receptacle 2a of the parking brake lever 2 and the tube-shaped receptacle 2a of the holder 7 are then engaged with the external teeth 5c of the shaft segment 5. In so doing, both the holder 7 and the parking brake lever 2 can be engaged with the shaft segment 5 in almost any arbitrary rotational position; in particular, the relative positions of the holder 7 and the parking brake lever 2 can be freely chosen, so an application-specific adaptation of the activation device 1 is possible. After the holder 7 and the parking brake lever 2 are engaged, the termination element 6 is inserted through the second hole 4 of the bearing block 3. The termination element 6 with a shaft piece 6a is then inserted into the hollow area of the shaft piece 5a of the shaft segment 5 and engaged there. The swivel bearing is thereby created for the parking brake lever 2 and the holder 7 on the bearing block 3, meaning that the parking brake lever 2 with the holder 7 can be swiveled on the bearing block 3 around a swivel axis defined by the shaft.

The parking brake lever 2 has a base body 2b running along a straight line. It can be surrounded by a lining, not shown, with a handle. A transfer device in the form of an actuation rod 11 is routed in the base body 2b of the parking brake lever 2. A button, not shown, is connected to the front end of the actuation rod 11. When it is pressed, the actuation rod 11 can be moved, preferably against the spring force of a spring, which is not shown.

The activation device 1 has a blocking device, which is comprised of a locking segment 12 and a pawl 13, to fix the parking brake lever 2 in place in a specified swivel position.

The locking segment 12 is connected in a fixed manner to the bearing block 3 and constitutes one physical unit with it. In the instant case, the locking segment 12 and the bearing block 3 have a one-piece design. The locking segment 12 has an arc-shaped contour in this case. As the sectional view of FIG. 2 shows, the locking segment 12 has internal teeth, meaning teeth provided on a concave surface of the locking segment 12, with a series of identically designed teeth 12a that extend over the entire length of the locking segment 12.

The pawl 13 is mounted on the parking brake lever 2 and is opposite the locking segment 12. Several ratchet teeth 13a are provided on the front end of the pawl 13 that is turned towards the locking segment 12.

The pawl 13 is movably mounted in the longitudinal direction in guides 14. The guides 14 are a component part of the parking brake lever 2 and are laterally connected to its base body 2b. The pawl 13 mounted in the guides 14 is coupled to the actuation rod 11 via a catch 15.

The operation of the assembled activation device 1 is explained below. When the activation device 1 has not been actuated via the button, the pawl 13 is pressed via contact pressure with its ratchet teeth 13a against teeth 12a of the locking segment 12 so that a specific swivel position of the parking brake lever 2 is then fixed in place with the blocking device that is formed in that way. This swivel position of the parking brake lever 2 is transferred to the parking brake by means of the transmission element. The parking brake is released or tightened, meaning activated, depending on the swivel position.

If an operator then presses the button, the actuation rod 11 is pressed backwards because of that. This linear movement of the actuation rod 11 is transferred via the catch 15 to the pawl 13, so the pawl 13 also carries out a linear movement is therefore moved away from the locking segment 12. The ratchet teeth 13a of the pawl 13 and the teeth 12a of the locking segment 12 are then no longer engaged with one another, and the operator can swivel the parking brake lever 2 into a new swivel position. This swivel position is transmitted through the transmission element to the parking brake. The operator then releases the button. The actuation rod 11 is automatically moved into its starting position because of the spring force of the spring. This linear movement of the actuation rod 11 is transmitted to the pawl 13 once again via the catch 15. The pawl 13 carries out a linear movement in the direction of the locking segment 12 because of that, so the ratchet teeth 13a of the pawl 13 engage with a partial segment of the toothing of the locking segment 12 and are held in place with contact pressure there; the new swivel position of the parking brake lever 2 is fixed in place because of that.

LIST OF REFERENCE NUMERALS (1) Activation device
(2) Parking brake lever
(2a) Tube-shaped receptacle
(2b) Base body
(3) Bearing block
(3a) Flank
(3b) Base piece
(4) Axle receptacle
(5) Shaft segment
(5b) Ring-shaped piece
(5c) External teeth
(6) Termination element
(6a) Shaft piece
(6b) Head piece
(7) Holder
(7a) Tube-shaped receptacle
(7b) Wedge-shaped piece
(8) Internal teeth
(9) Internal teeth
(10) Hole
(11) Actuation rod
(12) Locking segment
(12a) Teeth
(13) Pawl
(13a) Ratchet teeth
(14) Guide
(15) Catch

The invention claimed is:

1. Activation device (1) for a parking brake
  with a parking brake lever (2) swivel-mounted on a bearing block (3),
  with a blocking device comprising a pawl (13) on the parking brake lever (2) and
  a locking segment (12) on the bearing block (3),
  wherein the parking brake lever (2) is fixed in place in a swivel position via the engagement of the pawl (13) with the locking segment (12), with a transmission element via which the swivel position of the parking brake lever (2) is transmitted to the parking brake, and with a transfer device in or on the parking brake lever (2),
  wherein the engagement of the pawl (13) with the locking segment (12) is released by actuating the transfer device,
  characterized in that a shaft is provided to form a swivel bearing to which a holder (7) for the transmission element and the parking brake lever (2) can be affixed in different rotational positions, and that a linear movement of the pawl (13) is brought about via the transfer device, and wherein
  the shaft has a shaft segment (5) with external teeth (5c) and that the holder (7) and the parking brake lever (2) each have a tube-shaped receptacle (2a, 7a) with internal teeth (8, 9), wherein the tube-shaped receptacles (2a, 7a) with the internal teeth (8, 9) can be engaged in different rotational positions with the external teeth (5c) of the shaft segment (5).

2. Activation device according to claim 1, characterized in that the shaft has a termination element (6) that can be engaged with the shaft segment (5).

3. Activation device according to claim 1, characterized in that the shaft is rotatably mounted in axle receptacles (4) of the bearing block (3).

4. Activation device according to claim 1, characterized in that the transfer device constitutes an actuation rod (11) that is movably mounted in a longitudinal direction in the parking brake lever (2).

5. Activation device according to claim 4, characterized in that the actuation rod (11) is coupled to the pawl (13) via a catch (15) such that the movement of the actuation rod (11) is converted into a linear movement of the pawl (13).

6. Activation device according to claim 1, characterized in that the pawl (13) is a slide-in part that is mounted in guides (14).

7. Activation device according to claim 6, characterized in that the pawl (13) is movably mounted in the guides (14) of the parking brake lever (2) in their longitudinal direction.

8. Activation device according to claim 1, characterized in that the pawl (13) has several ratchet teeth (13a).

9. Activation device according to claim 8, characterized in that the locking segment (12) has toothing with a linear arrangement of teeth (12a), wherein a swivel position of the parking brake lever (2) is fixed in place by the ratchet teeth (13a) of the pawl (13) engaging with teeth (12a) of the locking segment (12).

10. Activation device according to claim 1, characterized in that the locking segment (12) is connected in a fixed way with the bearing block (3).

11. Activation device according to claim 10, characterized in that the bearing block (3) and the locking segment (12) are designed to be one piece.

12. Activation device according to claim 11, characterized in that the bearing block (3) and the locking segment (12) are made of one die-cast part.

* * * * *